United States Patent [19]

Ehrlenspiel et al.

[11] Patent Number: 4,692,126
[45] Date of Patent: Sep. 8, 1987

[54] CLAW COUPLING ASSEMBLY FOR TORQUE TRANSMISSION

[75] Inventors: Klaus Ehrlenspiel; Thomas John; Wolfgang Streinz, all of Munich, Fed. Rep. of Germany

[73] Assignee: Uni-Cardan Aktiengesellschaft, Siegburg, Fed. Rep. of Germany

[21] Appl. No.: 728,320

[22] Filed: Apr. 29, 1985

[30] Foreign Application Priority Data

Apr. 28, 1984 [DE] Fed. Rep. of Germany ....... 3415908

[51] Int. Cl.$^4$ ............................................. F16D 3/16
[52] U.S. Cl. ........................................ 464/103; 464/76
[58] Field of Search ............ 308/6 R; 384/461, 548, 384/553, 554, 555, 565; 464/49, 51, 55, 56, 73, 76, 81, 82, 83, 85, 102, 103

[56] References Cited

U.S. PATENT DOCUMENTS

| 953,700 | 4/1910 | Maxfield | 464/55 X |
| 2,092,704 | 9/1937 | Ricefield | 464/76 |
| 3,636,729 | 1/1972 | Patel | 464/73 X |

FOREIGN PATENT DOCUMENTS

| 229487 | 6/1959 | Australia | 464/76 |
| 186926 | 9/1956 | Austria | 464/56 |
| 1046417 | 12/1958 | Fed. Rep. of Germany | 464/76 |
| 3036570 | 4/1982 | Fed. Rep. of Germany . | |
| 898154 | 1/1982 | U.S.S.R. | 464/49 |
| 966344 | 10/1982 | U.S.S.R. | 384/565 |

Primary Examiner—Stuart S. Levy
Assistant Examiner—Daniel P. Stodola
Attorney, Agent, or Firm—Toren, McGeady and Goldberg

[57] ABSTRACT

A torque transmitting coupling assembly including a driving member and a power takeoff member, each of which have an equal plurality of claws thereon with movable transmission members interposed between the claws, the claws having lateral surfaces which define therebetween spaces which narrow radially, with the transmission members being held in these spaces by at least one endless flexible traction member which contacts the transmission members on the sides thereof remote from the narrowed portions of the spaces between the claws. The coupling compensates for radial, axial and possibly, also angular offsetting of shafts which are placed in torque transmitting engagement by the assembly.

7 Claims, 12 Drawing Figures

CLAW COUPLING ASSEMBLY FOR TORQUE TRANSMISSION

The present invention relates generally to a torque transmitting assembly and more particularly to a claw coupling assembly for transmitting torque between two shafts.

Devices of the type to which the present invention relates normally comprise a driving part and a power takeoff or driven part, each having an equal plurality of claws, with movable transmission members interposed between the claws.

In the prior art, claw couplings, chain joints and snake spring couplings are known. A disadvantage of such prior art devices is that they have very limited offset compensation. Moreover, sliding friction occurring between the transmission members and the claws leads to friction losses and wear.

The present invention is directed toward providing a claw coupling assembly for transmitting torque and rotational power which can compensate larger radial, axial and possibly, also, angular offsetting of the shafts than is possible with known claw coupling assemblies having movable transmission members. Additionally, the invention is directed toward provision of a claw coupling assembly possessing a certain torsional elasticity so that torsional oscillations and vibrations and shocks or impacts due to the torque transmission can be damped.

SUMMARY OF THE INVENTION

Briefly, the present invention may be described as a claw coupling assembly wherein an equal plurality of claws are provided on a driving member and on a driven or power takeoff member with the claws having lateral surfaces defining therebetween spaces which narrow radially. Transmission members are located within these spaces and they are held therein by means of at least one endless flexible elastic traction member which contacts the transmission members on the sides thereof remote from the narrowed portions of the spaces defined between the claws.

The transmission members, which are held between the claws on the driving side and the claws on the power takeoff side by means of the traction members, will transmit peripheral forces from the claws of the driving member to the claws of the power takeoff member. The driving member and the power takeoff member are generally constructed so as to be disc-shaped, for example, as circular discs, and the claws are arranged so as to be uniformly distributed at the circumference of the driving member and of the power takeoff member in such a manner that, while engaging with one another, they will leave open intermediate spaces for the transmission members.

The transmission members may have a cylindrical configuration and they may be constructed as spherical members or with a barrel shape. The flexible traction means or members contact the transmission members over a surface area thereof and, as a result of the elasticity of the traction means, there will be enabled compensation of radial and angular offset of the shafts which are driven through the coupling assembly. Despite rigid transmission members, the coupling assembly will be torsionally elastic, since the transmission members are radially displaced against the resilient forces of the traction means. Accordingly, torsional oscillations are also damped by means of the coupling.

The narrowing of the spaces between the claws is effected by means of radial chamfering or beveling of the lateral surface of the claws and, in a preferred embodiment of the invention, these chamfered lateral surfaces are formed as planar surfaces so that wedge-shaped spaces or gaps are provided.

In a preferred embodiment of the invention, the spaces are defined so as to narrow radially inwardly of the assembly and the traction means are arranged to contact the transmission members on the radially outer side thereof. The transmission members are thus drawn into the narrowing side of the spaces between the claws by means of the traction means and they are held in contact with the claw surfaces.

The angle of contact of the transmission means on the transmission members may be, for example, 60°, 120° or 180°, regardless of the guiding of the traction means, if the coupling has three claws on each of the driving side and the power takeoff side.

In one embodiment of the invention, only one traction member is provided which contacts all the transmission members. In this embodiment, the forces exerted on the transmission members by the traction means and, also, the transmission behavior, are the same in both rotational directions.

In another embodiment of the invention, two traction means are provided, one of which is guided around the transmission members contacting the claws on the power takeoff side in one rotational direction and the other of which is guided around the transmission members contacting these claws in the other rotational direction. In this case, the coupling can be equipped in the two rotational directions with different torsional elasticity by means of differentiating the two traction means. In a coupling with six transmission members between three claws on the driving side and three claws on the power takeoff side, each traction member or means may be arranged to contact or be tensioned around three transmission members.

This principle can be also applied in couplings having larger numbers of claws and transmission members, for example, in couplings with eight transmission members arranged between four claws on the driving side and four claws on the power takeoff side, each traction means may contact four transmission members.

The traction means may consist of one or more belts, cables or chains extending in a parallel manner, that is, with each traction means comprising several traction elements. The flexibility of the traction means must permit contact at the transmission members and, if necessary, deflection and its elasticity must permit lengthening of the polygonal length occurring during offsetting, during switching of the contact angles.

In another embodiment of the invention, the traction means are guided outside the intermediate spaces between the claws by deflection pegs or trunnions. The deflection of the traction means is particularly advantageous in the interior of the coupling. The traction means are guided over pegs arranged near the coupling axis in order to prevent one traction member from hindering the radial movement of the transmission members around which the other traction member may be looped.

In accordance with a preferred embodiment of the invention, transmission members have at least one area of reduced diameter symmetrical to their central plane, with this area being partly contacted by the traction means and having the the traction means partly tensioned therearound. By means of guiding the traction means around the reduced area of the transmission member, it will be prevented from jamming between the transmission member and the claw. If the coupling is equipped with two traction means, the reduced guide areas of the transmission member which is contacted by one of the tractions means is preferably offset relative to the reduced guide areas of the transmission members contacted by the other traction means. Preferably, one traction means is guided over reduced areas which are centrally arranged on the transmission members, while the other traction means, consisting of two separate endless traction elements, is guided over two reduced border or rim areas of the transmission members.

In a further preferred embodiment of the invention, the claws on the driving member and on the power takeoff member have, in their axially central areas, a lateral surface projecting into one or the other rotational direction and in their axial border areas on both sides of the central area, they have lateral surfaces projecting into the other respective rotational direction. In the spaces with lateral surfaces projecting in the central area and in the border areas, respectively, the transmission members likewise have projecting support surfaces in the central area and in the border areas, respectively, and the traction means are guided around the surfaces which are recessed relative to the support surfaces. This embodiment has substantially symmetrical sectioning or shaping of the transmission member and of the claws and insures an unimpeded radial movement of the traction means.

The part of the transmission member having the central support surface or surfaces is preferably rotatably supported relative to the part having the guide surfaces. In this way, sliding friction between the lateral surfaces of the claws and the transmission members is prevented. Moreover, pegs for the traction means deflection can carry rotatably supported sleeves. The frictional resistance or drag between the traction means and the deflection pegs is substantially reduced as a result of this. However, bending resistance of the traction means at the deflection pegs must be overcome in this case.

The transmission member preferably consists of a cylindrical central part with an axial peg on each front face and rollers that are rotatably supported on the peg and a lateral surface of the one claw in the central area, which lateral surface faces toward the transmission member, is raised, as is that of the other claw and the two border areas. When using this double roller as the transmission member, sliding friction between the claws and the transmission members is essentially completely prevented, since the aforementioned central part can roll on one claw surface and the rollers may roll on the other claw surface.

The claws on the driving side or those on the power takeoff side can be constructed as radial webs having a common inner part. With a corresponding guidance of the traction means, it is possible to construct the coupling assembly in such a way that it will be suitable for the connection of a shaft with a hollow shaft, such as is often required in rail vehicle drives. When there is an even number of transmission members of more than four, no imbalance will be caused by the transmission members in the coupling as a result of the invention.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

DETAILED DESCRIPTION OF THE PREFERRED EMBODIMENTS

Figure 1:
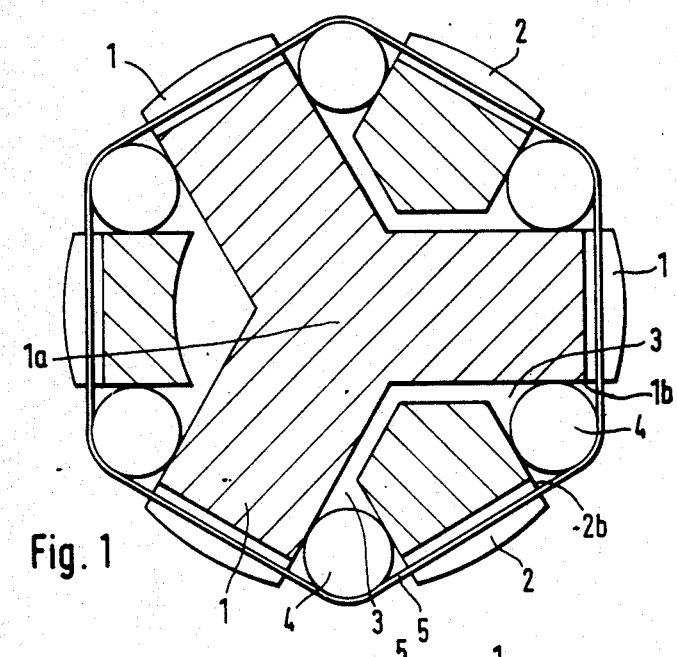
FIG. 1 is a sectional schematic representation of a first embodiment of a claw coupling assembly according to the invention.

Referring now to the drawings and particularly to FIG. 1, there is shown a first embodiment of the invention, which comprises a coupling assembly having three claws 1 projecting outwardly at an angle of 120° constructed at an inner part 1a which is a driven member or drive side of the assembly. A power takeoff part carries three claws 2 which project between the claws 1 on the drive side. Lateral surfaces 1b and 2b of the claws 1 and 2 enclose spaces 3 which narrow inwardly in a wedge-shaped manner and in which a transmission member 4 is arranged in each case.

Traction means 5 in the form of one or more steel belts or bands is guided around all six transmission members 4 and holds them in the spaces 3 in contact with the lateral surfaces 1b, 2b of the claws.

Figure 2:
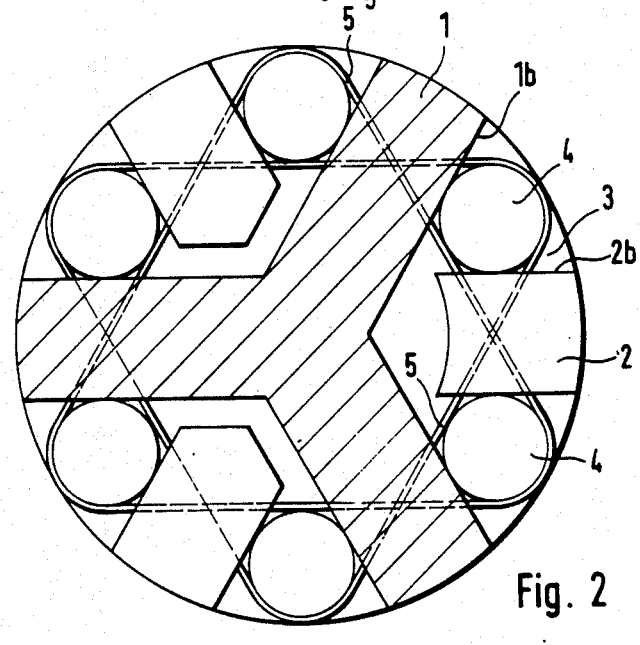
FIG. 2 is a sectional schematic representation of a second embodiment of the invention.

In the embodiment of FIG. 2, there is provided an arrangement which differs from that of FIG. 1 in that, instead of one traction means, two traction means 5 are provided which contact and are tensioned around every second transmission member 4 in each instance.

Figure 3:
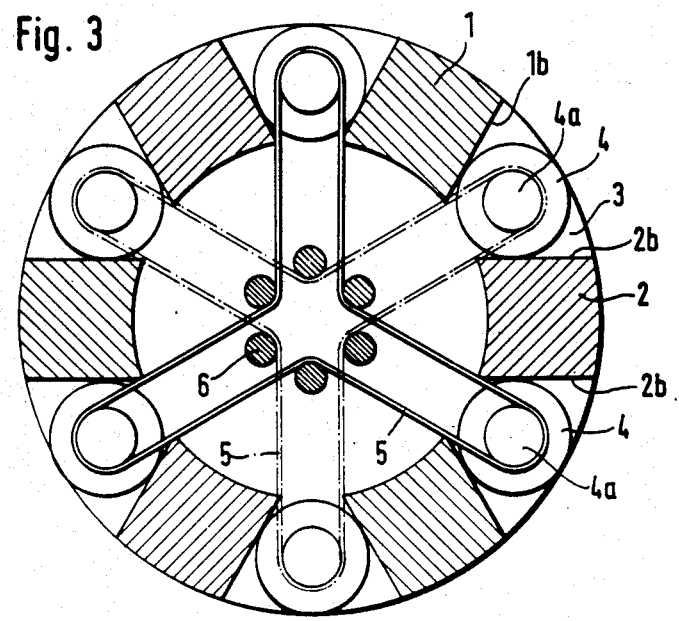
FIG. 3 is a sectional schematic representation of a third embodiment of the invention.

In the embodiment of FIG. 3, the claws 1 of the driving member as well as the claws 2 of the power takeoff member are constructed as circumferential or peripheral claws. The spaces 3 between the lateral surfaces 1b, 2b of the claws 1, 2 narrow radially inwardly. The transmission members 4 are cylindrically constructed and have cylindrical pegs 4a on their front face, around which cylindrical pegs 4a, the traction means 5 are guided. Arranged on the driving member, formed as a drive disc, are six spaced axial pegs 6 at which the traction means are deflected. A comparison with the embodiment according to FIG. 2 shows that the stretches of the traction means, i.e., the stretches between the rollers or pegs, are dislocated or shifted toward the coupling axis so that the radial movements of the transmission members 4 are not impeded.

Figure 4:
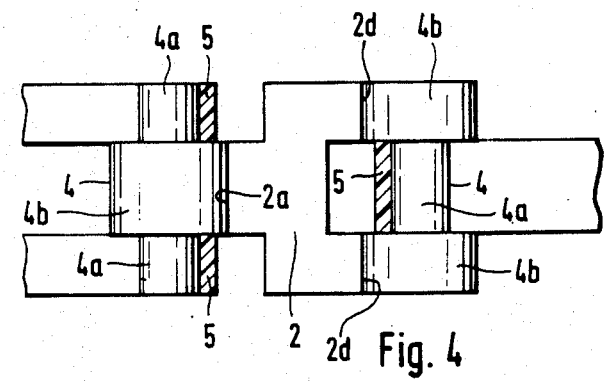
FIG. 4 is an axial section of two adjacent transmission members with the claw located between them in accordance with a fourth embodiment of the invention.

In the embodiment shown in FIG. 4, the adjacent transmission members 4 are formed differently because the axially offset traction means 5 loops around them. The left transmission member 4 has a cylindrical central part 4b of a greater diameter, as well as cylindrical areas 4a of a smaller diameter attached axially thereat. The traction means 5 looped around this transmission member consists of two separate belts guided around the cylindrical border areas 4a. The right transmission member 4 is constructed inversely with respect to the left one, i.e., the central cylindrical area 4a has a smaller diameter and the two border areas 4b are of greater diameter and are connected to it at the front face. In this case, the traction means 5 contacts or is tensioned around the area 4a. The lateral surfaces of the claw 2 have a sectioning that is symmetrical to the adjoining transmission members 4. The projecting lateral surface 2a in the central area corresponds to the projecting central area 4b of the left transmission member, and the projecting lateral surfaces 2c on the both sides of the central area correspond to the projecting border areas 4b of the right transmission member. The surfaces 2a and 2c are likewise parallel plane surfaces, like the claw lateral surfaces 2b and 1b of the couplings according to FIGS. 1 to 3.

The embodiment shown in FIG. 4 prevents, by means of the offsetting of the two traction means, the spatial impediment of the latter in the interior of the coupling. Moreover, the traction means act on the transmission members so as to be symmetric to their central plane so that a uniform loading of the supporting or carrying surfaces is achieved.

Figure 5:
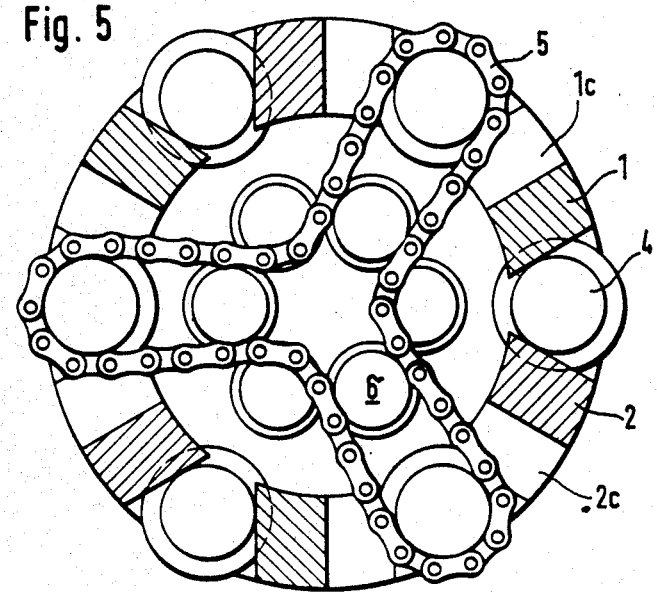
FIG. 5 is a sectional schematic representation of a fifth embodiment of the invention.

The embodiment according to FIG. 5 differs from that of FIG. 3 only in that, instead of the belts, steel chains, only one of which is shown, serve as traction means 5. The transmission members 4 and the sleeves of the deflection pegs 6 carry corresponding toothed rims (not shown). The claws 1, 2 have grooves 1c, 2c in this embodiment for the movements of the chain 5.

Figures 6, 7, 8:
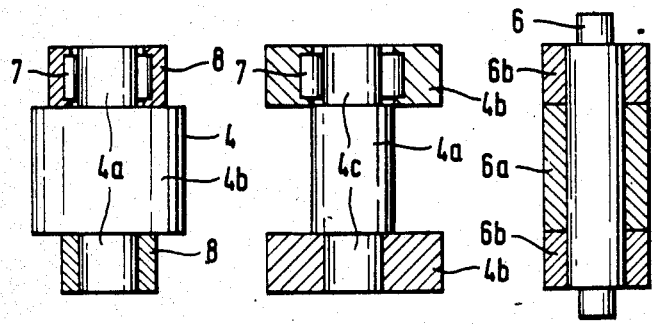
FIG. 6 is an axial section of a transmission member.
FIG. 7 is an axial section of another form of the transmission member.
FIG. 8 is an axial section of a deflection peg.

The transmission members shown in FIGS. 6 and 7 substantially correspond in their form to the two members 4 shown in FIG. 4. However, the embodiment according to FIG. 6 differs in that sleeves 8 are rotatably supported on the end or front side pegs 4a by means of slide bearings or roller bearings 7. The sliding friction between the traction means and the transmission members is thereby avoided.

In the embodiment according to FIG. 7, pegs 4c are formed at the front faces of the central part 4a on which pegs 4c, rings 4b are rotatably supported by means of slide or roller bearings 7. The sliding friction between the traction means and the central part 4a is again prevented by means of the rotating ability of 4b relative to 4a.

FIG. 8 shows the deflection peg 6 for a belt-shaped traction means on which a central sleeve 6a and two sleeves 6b overlapping the border areas are rotatably supported by means of slide bearings. The sliding friction between the traction means and the peg surface is avoided by means of this peg construction.

The cylindrical transmission members 4 are in linear contact with the claw surfaces 1b, 2b. During displacements of the transmission members 4 between the claws 1 and 2 as a result of the offsetting of the shafts, sliding friction losses still occur which are greater the larger the offsetting to be compensated. The sliding friction can be completely prevented if, instead of simple cylindrical rollers, double rollers are used as transmission members.

Figure 9:
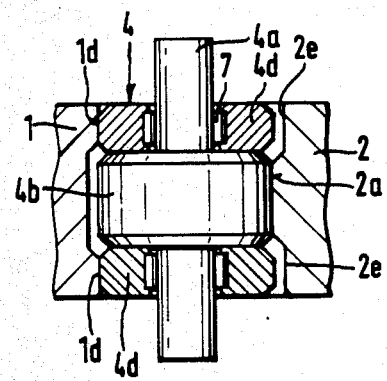
FIGS. 9, 10, 11 and 12 are axial sections of other forms of the transmission member.

FIG. 9 shows an embodiment wherein the transmission members are in the form of a double roller. The latter consists of a cylindrical central part 4b with axial pegs 4a on the front faces. Rollers 4d are rotatably supported on the pegs 4a by means of needle bearings 7. The cylindrical central part 4b and the cylinder ring-shaped rollers 4d have the same diameter. The pegs 4a extend axially out of the bore holes of the rollers 4d and serve, at the same time, as a contact for the traction means. The lateral surface of the claw 2 on the power takeoff side has a projecting central area 2a, whereas, on the lateral surface of the claw 1 on the drive side, the central area is recessed. It is the reverse in the border areas of the lateral surfaces of the claws 1, 2, which border areas correspond to the rollers 4d. The lateral surface of the claw 2 is recessed in the two border areas 2e, and the lateral surface of the claw 1 projects in the border areas 1d. The cylindrical central part 4b of the double roller can therefore roll on the central area 2a of the claw 2, while the rollers 4d can roll, at the same time, on the border areas 1d of the claw 1 on the drive side.

Figure 10:
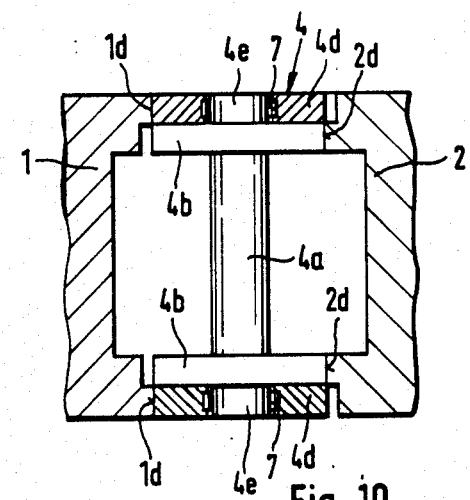

FIG. 10 shows the corresponding double roller for the centrally acting traction means. The central part 4a carries areas 4b projecting in the form of a flange near its ends. Cylindrical projections or pegs 4e project outwardly from the front faces of the flange-like areas 4b. The support rings 4d are rotatably supported on these projections by means of roller bearings 7. The claw 1 on the drive side has two parallel projecting areas 1d on which the rings 4d are supported. The claw 2 on the power takeoff side has two projecting parallel areas 2d which are axially offset relative to the areas 1d and on which the flange-like projections 4b are supported. By means of the structures shown in FIGS. 9 and 10, the transmission members 4 can perform pure rolling movements on the surfaces of the two claws 1, 2 and sliding friction and wear are substantially prevented.

Figure 11:
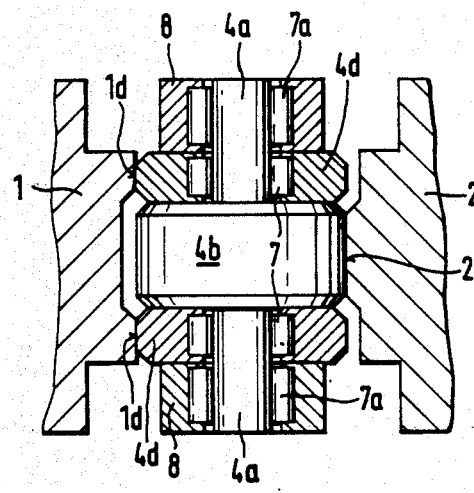

The double roller shown in FIG. 11 differs from the roller according to FIG. 9 only in that sleeves 8 are rotatably supported on the pegs 4a projecting out of the support rings 4d by means of roller bearings 7a. As a result, the sliding friction still occurring between the traction means and the pegs 4a in the embodiment of FIG. 9 is replaced by rolling friction.

Figure 12:
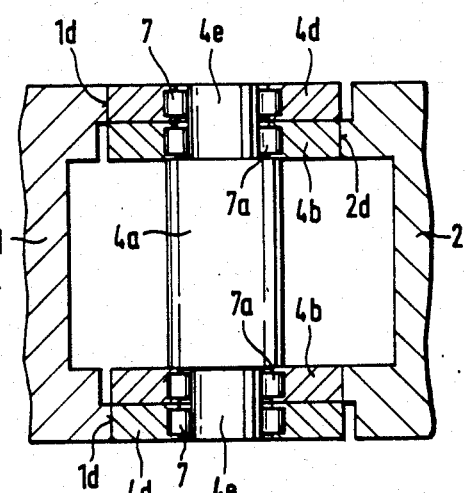

In the embodiment according to FIG. 12, the two flange-like projections 4b are no longer securely connected with the central part 4a as in the embodiment according to FIG. 10, rather they are rotatably supported on the pegs 4e as rings 4b by means of roller bearings 7a. In this embodiment, the central part 4a and the rings 4b and 4d are also rotatable independently of one another. By means of this, the sliding friction occurring in the embodiment according to FIG. 10 between the central part 4a and the traction means looped around the central part is prevented. The transmission members shown in FIGS. 11 and 12, therefore, cause no sliding friction losses and they run between the claws with low wear characteristics.

While specific embodiments of the invention have been shown and described in detail to illustrate the application of the inventive principles, it will be understood that the invention may be embodied otherwise without departing from such principles.

What is claimed is:

1. A claw coupling assembly for transmitting torque between two shafts, comprising:
    a driving member and a power takeoff member;

a plurality of claws on said driving member and an equal number of claws on said power takeoff member, said claws having lateral surfaces which define therebetween spaces which narrow radially;

movable transmission members interposed between said claws on said driving member and said claws on said power takeoff member within said spaces;

traction means engaging said transmission members on sides thereof remote from the narrowed portions of said spaces, said traction means comprising two flexible endless traction members, one of said traction members being guided around said transmission members and contacting said claws on said driving member in one rotational direction and the other of said traction members being guided around said transmission members contacting said claws in the other rotational direction;

said lateral surfaces on said claws on said driving member and on said power takeoff member comprising in axially central areas thereof a lateral surface projecting in one rotational direction and being formed in axial border areas on both sides of said central areas with lateral surfaces projecting in another respective rotational direction, wherein said transmission members in said spaces with said projecting lateral surfaces and in said central area and in the border areas also have projecting support surfaces in said central area and in said border areas respectively and wherein said traction means are guided around said surfaces which are recessed relative to said support surfaces.

2. An assembly according to claim 1, wherein said traction means consist of one of a belt, cable or chain.

3. An assembly according to claim 1, wherein said transmission members comprise deflection pegs and wherein said traction means are guided over said deflection pegs.

4. An assembly according to claim 3, wherein said deflection pegs carry rotatably supported sleeves.

5. An assembly according to claim 4, wherein said transmission members consist of a cylindrical central part having flange-like projections at ends thereof which have one of said deflection pegs on each front face with said sleeves rotatably supported on said peg, said lateral surfaces of said claws facing towards said transmission members being raised in said border areas opposite said projection with the other of said claws being raised in said border areas opposite said sleeves.

6. An assembly according to claim 1, wherein said part of said transmission members having said support surfaces is rotatably supported relative to the part thereof having said guide surfaces.

7. An assembly according to claim 1, wherein said transmission members consist of a cylindrical central part with an axial peg on front faces thereof and rollers rotatably supported on said peg and lateral surface of one of said claws, said lateral surface facing said transmission member and being raised in a central area thereof with that of another of said claws being raised in two border areas thereof.

* * * * *